Figure 1:
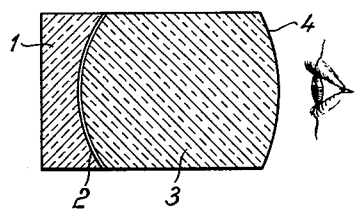

March 13, 1962  F. PAPKE  3,024,691
PHOTOGRAPHIC VIEWFINDER OF THE ALBADA-NEWTON TYPE
Filed June 6, 1958

INVENTOR
FRIEDRICH PAPKE

BY
Mock & Blum
ATTORNEYS

United States Patent Office 3,024,691
Patented Mar. 13, 1962

3,024,691
PHOTOGRAPHIC VIEWFINDER OF THE ALBADA-NEWTON TYPE
Friedrich Papke, Braunschweig, Germany, assignor to Voigtlander A.G., Braunschweig, Germany, a corporation of Germany
Filed June 6, 1958, Ser. No. 740,250
Claims priority, application Germany June 13, 1957
7 Claims. (Cl. 88—1.5)

This invention relates to finders for photographic cameras and it has particular relation to photographic finders in which the image to be observed by the eye appears on either a reduced scale or an enlarged scale.

In finders, hitherto known from the art, Newton finders which present the sighted image on a reduced scale, as well as Galilei finders, which present an enlarged image, have been built, as a rule from two separate optical parts, which are mechanically held in a suitable construction at a fixed separation from each other. The Newton finder is provided on the front or object end with a negative lens and has a positive lens at the rear or insight end. The Galilei finder is characterized by the reversed arrangement of the two determinative lenses.

According to the present invention, these known types of finders are designed in such a manner that their beforementioned optically active members are connected, without included air lenses, into a self-supporting structural unit, in which the optical parts forms a unitary block. The gap between the objective lens and the ocular lens is filled in, according to the present invention, by a light-permeable block which consists of glass or a suitable synthetic plastic material. This block can be of such character and dimensions that it has no optical effect by itself. Its index of refraction should strongly differ from the index of refraction of the front lens. This results in a considerable reduction of reflection, whereby the brilliance of the finder is considerably improved. Moreover, the production of finders built in this manner is simple and they are rugged in use, e.g. with regard to getting out of adjustment.

In carrying out the present invention, the desired structure can be obtained, for example, by forming the rear member, in relation to the front member, as a large block, whereby the beforementioned intermediate member, which is shaped as a block, is combined with the ocular form unit, or these parts are made of one piece. This rear member has a convex surface which is cemented to a concave inner end surface of the front member. In order to secure thereby the optical effect of the beforementioned finder types, in the Newton finder the index of refraction of the negative front lens is kept high and the index of refraction of the block connected to its inner end surface is kept low. In a reverse manner, in the Galilei finder the front lens consists of a glass of a relatively lower index of refraction and the glass block consists of a glass of relatively higher index of refraction.

In Newton and Galilei finders constructed in this manner, the so-called Albada finder principle can be realized in a particularly advantageous manner. According to this principle, a partially permeable concave mirror—through which the sighted image is observed by the operator—reflects a frame which is arranged in substantially the focal plane of the concave mirror. Thus, in dimensioning the beforementioned block finders the frame is arranged on the end surface of an intermediate block facing the eye, while the partially permeable concave mirror is located in the beforementioned cemented surface.

In constructing the Newton finder with the Albada principle, the frame to be reflected is arranged on a spherical separating surface which is curved in such a manner that it forms, with the original rear surface of the glass block, a positive lens. The front member of this tripartite finder is made of a glass having a high index of refraction. The intermediate member, of convex-concave design, has a low index of refraction, and the rear lens which forms the terminal part toward the eye can be made of a glass of any index of refraction. It preferably consists of a medium of high index of refraction. With a suitable selection of the index of refraction of this last lens, its surface facing the eye, as well as the front surface of the front lens, may be a plane surface.

It is also contemplated, according to the present invention, to construct the finder of four parts. Thereby, either the intermediate glass block or the front lens is divided by a spherical cementing surface which is concave toward the eye, and this surface carries the partially permeable mirror for reflecting the frame.

According to an advantageous and inexpensive modification, the parts of the finder, or at least the intermediate member, are made of a synthetic plastic material. Thereby conventional procedures of thermoplastic molding, or of casting with subsequent polymerization or of injection molding, and the like, can be applied.

As a rule, the conventional synthetic plastics are not hard enough for the outer surfaces of optical members and this is particularly true in the case of the lens facing the eye, the outer surface of which is directly adjacent the focal field of the mirror system imaging the frame. Even slight scratches or holes in the surface facing the eye can cause considerable trouble and result particularly in a reduction of the contrast and in fogging of the finder image. It is therefore contemplated according to the present invention to use a combination of glass and plastics in high quality finders. For example, plastic surfaces facing the eye or the object, can be protected by glass plates. The glass plates should be preferably cemented to the plastic in order to avoid reflections on uncemented adjacent surfaces. It has been found to be of particular advantage to use a construction type in which the front lens and the eye lens of the finder consist entirely of glass, whereby the corresponding surfaces of these lenses are provided with a partially permeable mirror and with a reflecting frame which may be, for example, applied by deposition with vaporization under high vacuum. These two glass lenses can be formed into a unitary block with the remaining optical part of the finder, which consists of a synthetic plastic, according to procedures which are conventional in the processing of plastic materials. The glass lenses can be partially or entirely embedded in the plastic material, as by forming the front and rear end of the plastic block with recesses for receiving the lense for insight and outlook, respectively. On the other hand, the intermediate block of plastic material can be designed in such a manner that the block partially overlaps of the edges the two glass lenses which are attached on both ends and thus holds together all the parts of the finder. Furthermore, members for holding the finder on the camera can be associated with the plastic parts of the finder during their casting.

The frame to be reflected can likewise be embedded in plastic material. It is thereby possible to make it of sheet metal or the like, for example as a punched member.

The appended drawings diagrammatically illustrate some specific embodiments of and best modes for carrying out the invention, to which the invention is not limited.

Figure 2:
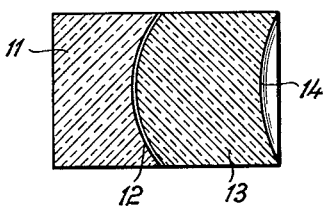
Figure 3:
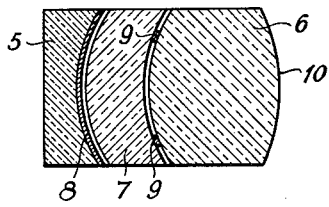
Figure 4:
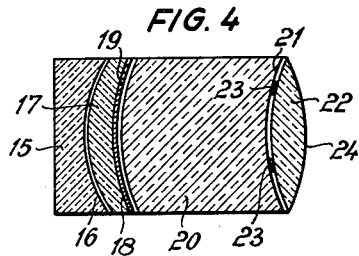
Figure 5:
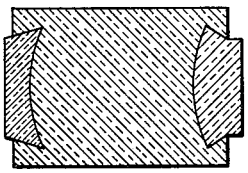
Figure 6:
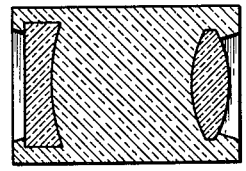
Figure 7:

In the drawings, FIG. 1 illustrates a Newton finder of simple construction, embodying the invention. FIG. 2 illustrates a Galilei finder. FIGURE 3 shows a Newton finder according to the invention, in which the Albada principle is incorporated, and FIG. 4 illustrates a Newton finder with reflected frame. FIGURES 5 and 6 illustrate specific examples of the finder including a plastic block according to the invention, while FIG. 7 illustrates embedding of glass parts, carrying a partially permeable mirror and the frame, in the plastic material.

Referring now to the drawings in detail, in the Newton finder shown in FIG. 1, the plano-concave front lens 1 consists of highly refractive glass, the concave surface 2 of which is cemented to body 3. The index of refraction of body 3 is considerably lower than that of front lens 1. The surface 4 of part 3, facing the eye, is curved in conventional manner in accordance with the requirements called for by the geometric-optical conditions of the Newton finder.

FIGURE 2 illustrates a Galilei finder. The lens 11 consists of a material having a low index of refraction and is cemented along the concave eye facing surface 12 to body 13, the concave surface 14 of which has a correspondingly shaped concave curvature. Body 13 consists of a material having a considerably higher index of refraction than that of front lens 11.

In the embodiment illustrated in FIG. 3, the Albada principle is incorporated in a Newton finder embodying the present invention. This finder consists of three parts and contains no air lens. The front lens is denoted 5, the ocular lens 6 and the light-permeable block connecting these lenses is shown at 7. Lens 5 consists of a medium having a relatively high index of refraction, while the index of refraction of parts 6 and 7 is relatively low. The result is a particularly advantageous structure which, on the one hand meets the requirements of a Newton finder, and on the other hand is adapted to reflect the frame according to the Albada principle. The partially permeable mirror 8 is seated at the common cemented surfaces radius of lenses 5 and 7, while the frame 9 to be reflected is applied to the common cemented surfaces of body 7 and body 6, The absence of any air lens in the construction according to FIG. 3 improves the reflex formation of the finder. Moreover, this construction is very advantageous from the point of view of manufacture.

If the intermediate block 7 and the lens 6 are made, for example, of plate or mirror glass, and the front lens 5 of a flint glass having an $n_d$ value of about 1.62, then in a structure according to FIG. 3, with the use of curvatures which are practicable from the point of view of manufacturing, a resolution in size of 1:0.9 is obtainable, whereby a relatively large image angle of e.g. 35°–45° results.

If, in the example illustrated in FIG. 3, the indexes of refraction are interchanged, i.e. if the lens 5 is made of a medium having an extremely low index of refraction while the bodies 6 and 7 are made of material having a high index of refraction, a finder results which has an enlarging ratio exceeding 1:1. In this case, surface 10 facing toward the eye has to be shaped concave.

FIGURE 4 illustrates a Newton finder embodying to the invention and provided with a reflected frame. In this example the finder consists of four parts without included air lenses. Member 15 is a plano-concave front lens having a relatively high index of refraction, and this front lens 15 has its curved surface 16 cemented to body 17 so as to eliminate reflection. The concave surface 18 of lens 17 carries a partially permeable mirror 19 and is cemented to block 20. To the eye facing concave surface 21 of this member 20, a biconvex lens 22 is cemented as the ocular. This lens 22 carries the frame 23 to be reflected. The index of refraction of lens 15 is higher than the indices of refraction of members 17 and 20, while the index of refraction of lens 22 can be selected in any desired manner. For example, it can be selected in such a manner that the optical calculation of the system for the eye facing last surface 24 is a plane surface, so that, in this case, lens 22 is a plano-convex lens.

FIGURES 5 and 6 illustrate examples of a finder including a plastic block, according to the invention. The advantage of a finder designed and manufactured in this manner consists, among others, in that no separate molds for the spherical surfaces of the plastic block are needed, and the lens surfaces (obtained according to the conventional methods of glass processing) of the parts to be embedded, can be used as molds. Moreover, the subsequent mounting of the three individual parts to form a unit, can be eliminated in the manufacture of such finders. In addition, the use of plastic material renders it possible to design the finder in such a manner that means for holding the finder in the camera can be incorporated in the finder during casting.

There are many plastic or polymerizable materials which do not show unlimited adherence to glass, and, therefore, embedding can be carried out in such a manner that the plastic material partially overlaps the glass member so that the coherence of the block is secured even in the absence of adhesion. Such an example is also shown in FIGURES 5 and 6.

In a similar manner, glass members carrying the partially permeable mirror and the frame also can be embedded in the plastic material. Such an example is illustrated in FIGURE 7.

It is also contemplated according to the present invention to particularly design the cementing surfaces repeatedly mentioned above. It should be noted that normal designs, in which the cementing surfaces consist of polished lens surfaces, yield rather satisfactory results. However, it is possible, in comparison to this, to considerably reduce the cost of production without adverse effect on the optical quality. In this connection, it is contemplated to only roughly process the cementing surfaces of the lenses, for example only by milling, grinding, turning, or pressing. To the roughly processed cementing surface an immersion cement is then applied, which renders the roughly processed surface transparent and causes the cemented body to appear transparent. This procedure, which has been known by itself in optical manufacturing, is utilized for the present invention in a progressive manner. It is thereby necessary to proceed in such a manner that, in the case of two adjacent non-polished surfaces, the same index of refraction is selected for both adjacent lenses, and the cement should also have such equal index of refraction. Epoxy resins and ethoxyline resins have been found to be particularly satisfactory for this purpose. The surface carrying the semi-permeable mirror should not be left in rough condition, and this surface should be polished. In the case of two bordering lenses having different indices of refraction, preferably that surface for the glass of which a suitable cement of approximately equal index of refraction is available should be left impolished, while the other contact surface should be polished. For example in the embodiment according to FIG. 1, which illustrates a finder having four optically active surfaces, three surfaces would have to be polished, i.e. the outer surfaces and the concave surface of lens 1. Thereby the member 3 consists e.g. of plate or mirror glass and the cement is a polymerization cement having an epoxy resin base.

It will be understood from the above that this invention is not limited to the above described structures, arrangements, materials and other details specifically described above and illustrated in the drawings and can be carried out with various modifications without departing from the scope of the invention as defined in the appended claims.

The above mentioned procedure, in which two glass lenses are provided to form a unitary block with the remaining optical part consisting of a synthetic plastic material, formation of the unit can be carried out by polymerization in the following manner. The front lens and the rear lens are fastened in a trough-like vessel in such a manner that the lenses are placed in the position which they subsequently occupy in the finder. The inner shape of the trough-like vessel or container is thereby identical with the outer shape of the entire finder block. The flanks of the container are provided with a coating to which the plastic to be poured into the container does not adhere. A polymerizing composition of a suitable synthetic resin is now poured into the vessel or container, wherein its polymerization takes place. As an example of the synthetic resin, polymerizable methyl methacrylate is mentioned. During polymerization, a certain shrinkage of the resin takes place and this must be taken into consideration by using a vessel of correspondingly oversized dimensions. In carrying out this process for producing a finder according to the present invention, it is of advantage to use glass members having the design shown in FIGS. 5 and 6. The reason is that some of the above mentioned plastic materials do not strongly adhere to glass and satisfactory fastening of the parts to each other should be secured by overlapping due to the design of glass and plastic members, respectively.

The front lens 1 shown in FIG. 1 consists, for example, of glass SSK5 having an index of refraction $n_d = 1.6584$ and member 3 shown in FIG. 1 may consist of glass BK7 having an index of refraction $n_d = 1.5168$. In the example shown in FIG. 1, the front surface of front lens 1 is plane, the curved rear surface 2 of this lens 1, as well as the surface cemented thereto of member 3, has a radius of 18 mm. The rear surface 4 of member 3 has a radius of curvature of 87 mm.

In the example illustrated in FIG. 2, front lens 11 may consist of glass F6 having an index of refraction $n_d = 1.6364$ and member 13 may consist of glass BK3 having an index of refraction $n_d = 1.4983$.

In the example illustrated in FIG. 3, the materials of members 5, 6 and 7 may be as follows:

Lens 5 may consist of glass SFS3 having an index of refraction $n_d = 1.7847$.

Members 6 and 7 may consist of glass BK7 having an index of refraction $n_d = 1.5168$.

If, in the example illustrated in FIG. 3, the indices of refraction are interchanged in the manner outlined above, the glasses may have the following characteristics: Lens 5 may consist of glass BK7 having an index of refraction $n_d = 1.5168$ and members 6 and 7 may each consist of glass SFS3 and have an index of refraction $n_d = 1.7847$.

The meaning of the symbols BK3, BK7, F6, SSK5 and SFS3, which denote various kinds of glasses, is explained e.g. in the September 1956 edition No. 350 of the glass-catalogue of "Jenaer Glaswerk Schott & Gen., Mainz."

What is claimed is:
1. A solid block photographic viewfinder of the Albada-Newton type, providing a reduced image of the object, arranged for mounting in photographic cameras, said viewfinder comprising plural optical members of transparent solid material integrally united, by transparent optical cement, in end-surface to end-surface relation at substantially mating interfaces to form an integral self-contained unit; said viewfinder including an object-facing, unequal-sided dispersion lens having a substantially planar outer surface and a concave inner surface, said dispersion lens having a high index of refraction; an intermediate block-shaped member following said dispersion lens and having a convex object-facing surface substantially mating with said concave inner surface and integrally united to the latter by a layer of transparent optical cement to form a first interface; a semi-light-permeable mirror in said first interface and facing the eye end of the viewfinder; said intermediate member having an index of refraction lower than that of said dispersion lens so that said dispersion lens has a dispersing refraction numerically in excess of the refraction of said intermediate member, whereby the negative refractive effect toward the eye end of the viewfinder provides a reduction of the image of the object; said intermediate member having a concave eye-facing surface; said viewfinder including a condensing ocular lens having a convex object-facing surface substantially mating with the concave eye-facing surface of said intermediate member and integrally united to the latter by a layer of transparent optical cement to form a second interface, said ocular lens further having a convex eye-facing surface; an image limiting frame positioned in said second interface for illumination by light rays entering through said dispersion lens and passing through said semi-light-permeable mirror and said intermediate member; said ocular lens having an index of refraction of a value such that its condensing refraction compensates for the dispersing refraction of said dispersion lens to the extent that a pencil of parallel rays, entering the object side of the viewfinder and centered on the optical axis thereof, will emerge from said ocular lens as a pencil of substantially parallel rays centered on said optical axis; said second interface, and thus said image limiting frame, being positioned at substantially the focal point of that part of the optical system of the viewfinder following said partially-light-permeable mirror and in advance of the eye-facing surface of said ocular lens, which focal point is determined conjointly by the focal length of said partially-light-permeable mirror and the refractive effect of such following part of the optical system of said viewfinder; whereby an observer, looking through said viewfinder, sees the object image sharply defined through the entire viewfinder, and further sees a sharply defined image of said frame provided by reflection from said partially-light-permeable mirror, through the optical system of the viewfinder following such mirror and exerting a light refractive effect.

2. A photographic viewfinder, as claimed in claim 1 in which said dispersion lens comprises a pair of said transparent members having substantially mating and facing surfaces united by transparent optical cement to form a third interface which is concave toward the eye-facing end of said viewfinder; said pair of members having indices of refraction such that there is introduced, at said third interface, a finite differential of refraction effective to modify the dispersing refraction of said dispersion lens.

3. A photographic viewfinder, as claimed in claim 2, in which the index of refraction of the outer member of said pair of members forming said third interface has a value sufficiently higher than that of the inner member of said pair so as to provide the full dispersing refractive effect of said dispersion lens at said third interface; whereby the necessity for a refraction differential at said first interface is substantially eliminated.

4. A photographic viewfinder as claimed in claim 1 in which both said intermediate member and said ocular lens have indices of refraction lower than that of said dispersion lens.

5. A photographic viewfinder as claimed in claim 4 in which the index of refraction of said intermediate member is intermediate the indices of refraction of said dispersion lens and said ocular lens.

6. A photographic viewfinder as claimed in claim 4 in which the index of refraction of said intermediate member and said ocular lens is 1.5168.

7. A photographic viewfinder as claimed in claim 1 in which the index of refraction of said dispersion lens has a value between 1.6584 and 1.7847.

References Cited in the file of this patent

UNITED STATES PATENTS

| | | |
|---|---|---|
| 1,267,014 | Tillyer | May 21, 1918 |
| 2,328,603 | Bennett et al. | Sept. 7, 1943 |
| 2,346,002 | Bennett et al. | Apr. 4, 1944 |
| 2,382,660 | Penberthy | Aug. 14, 1945 |
| 2,423,267 | Strang | July 1, 1947 |

FOREIGN PATENTS

| | | |
|---|---|---|
| 552,355 | France | Jan. 19, 1923 |
| 996,990 | France | Sept. 5, 1951 |
| 558,417 | Germany | Sept. 7, 1932 |
| 1,004,913 | Germany | Mar. 21, 1957 |